(12) United States Patent
Huisenga et al.

(10) Patent No.: US 7,187,158 B2
(45) Date of Patent: Mar. 6, 2007

(54) PROCESS DEVICE WITH SWITCHING POWER SUPPLY

(75) Inventors: Garrie D. Huisenga, Chaska, MN (US); James A. Johnson, Savage, MN (US); Jonathon M. Jongsma, Minneapolis, MN (US)

(73) Assignee: Rosemount, Inc., Eden Prairie, MN (US)

( * ) Notice: Subject to any disclaimer, the term of this patent is extended or adjusted under 35 U.S.C. 154(b) by 227 days.

(21) Appl. No.: 10/825,475

(22) Filed: Apr. 15, 2004

(65) Prior Publication Data

US 2005/0231182 A1 Oct. 20, 2005

(51) Int. Cl.
G05F 1/40 (2006.01)
H02H 7/16 (2006.01)

(52) U.S. Cl. .................................... 323/282

(58) Field of Classification Search ............ 323/265, 323/266, 268, 270, 271, 273, 275, 276, 279, 323/282, 285, 286
See application file for complete search history.

(56) References Cited

U.S. PATENT DOCUMENTS

| | | | |
|---|---|---|---|
| 4,015,609 A | 4/1977 | Mensink et al. ...... 128/419 PG |
| 4,206,297 A | 6/1980 | Hoff et al. ...................... 323/22 |
| 4,413,224 A | 11/1983 | Krupka et al. .............. 323/222 |
| 4,502,318 A | 3/1985 | Converse, III et al. ........... 73/3 |
| 4,606,076 A | 8/1986 | Davis ......................... 455/343 |
| 4,621,551 A | 11/1986 | Silverman ...................... 82/31 |
| 4,755,773 A | 7/1988 | Ohmagari ...................... 332/9 |
| 4,804,958 A | 2/1989 | Longsdorf ................... 340/860 |
| 4,833,922 A | 5/1989 | Frick et al. .................... 73/756 |
| 4,866,435 A | 9/1989 | Frick ...................... 340/870.16 |
| 4,889,179 A | 12/1989 | Merenda ...................... 165/14 |
| 4,970,451 A | 11/1990 | Suomalainen ............... 323/222 |
| 5,087,871 A | 2/1992 | Losel .......................... 323/299 |
| 5,089,974 A | 2/1992 | Demeyer et al. ........... 364/492 |
| 5,146,401 A | 9/1992 | Bansal et al. ............... 364/138 |
| 5,179,488 A | 1/1993 | Rovner ........................ 361/18 |
| 5,184,094 A | 2/1993 | Kohler ........................ 331/158 |
| 5,187,474 A | 2/1993 | Kielb et al. ................. 340/870 |
| 5,245,333 A | 9/1993 | Anderson et al. ........... 340/870 |
| 5,258,868 A | 11/1993 | Jensen et al. ............... 359/168 |
| 5,333,114 A | 7/1994 | Warrior et al. .............. 364/550 |

(Continued)

FOREIGN PATENT DOCUMENTS

DE 4021258 A1 1/1991

(Continued)

OTHER PUBLICATIONS

Brochure: "Preliminary LTC1149, LTC1149-3.3., LTC 1149-5; High Efficiency Synchronous Stepdown Switching Regulator", Linear Technology Corp. Milpitas, CA, pp. 1-16, Nov. 1992.

(Continued)

Primary Examiner—Matthew V. Nguyen
(74) Attorney, Agent, or Firm—Westman, Champlin & Kelly, P.A.

(57) ABSTRACT

A process field device for coupling to a two wire process control loop includes a field device circuitry and a switching regulator to power the circuitry. A series regulator provides a regulated supply voltage to the switching regulator. A noise filter reduces the amount of noise from the switching regulator which enters the two wire process control loop.

24 Claims, 7 Drawing Sheets

U.S. PATENT DOCUMENTS

| | | | |
|---|---|---|---|
| 5,360,997 A | 11/1994 | Watson | 323/268 |
| 5,377,090 A | 12/1994 | Steigerwald | 363/20 |
| 5,535,243 A | 7/1996 | Voegele et al. | 375/259 |
| 5,541,860 A | 7/1996 | Takei et al. | 702/141 |
| 5,606,513 A | 2/1997 | Louwagie et al. | 364/510 |
| 5,610,552 A | 3/1997 | Schlesinger et al. | 327/560 |
| 5,659,206 A | 8/1997 | Taguchi et al. | 307/11 |
| 5,710,552 A | 1/1998 | McCoy et al. | 340/870.21 |
| 5,764,891 A | 6/1998 | Warrior | 395/200.2 |
| 5,973,942 A | 10/1999 | Nelson et al. | 636/21.01 |
| 6,178,101 B1 * | 1/2001 | Shires | 363/39 |
| 6,313,616 B1 * | 11/2001 | Deller et al. | 323/282 |
| 6,489,755 B1 * | 12/2002 | Boudreaux et al. | 323/282 |
| 6,577,516 B1 | 6/2003 | Thoren et al. | 363/84 |
| 6,646,362 B2 * | 11/2003 | Bert et al. | 307/130 |
| 6,806,693 B1 * | 10/2004 | Bron | 323/280 |
| 6,813,318 B1 | 11/2004 | Westfield et al. | 375/295 |
| 2002/0101748 A1 | 8/2002 | Loechner | 363/84 |

FOREIGN PATENT DOCUMENTS

| | | |
|---|---|---|
| EP | 0 529 391 A1 | 6/1998 |
| GB | 2229897 A | 3/1990 |
| WO | WO94/01764 | 1/1994 |
| WO | WO 02/09268 | 1/2002 |

OTHER PUBLICATIONS

Ullrich Von Seckendorff and Karen Speers, "Selecting an Inrush Current Limiter," *Electronic Products,* Jan. 1995, pp. 25-33.

"Electronics Letters an International Publication," The Institution of Electrical Engineers, Aug. 29, 1996, vol. 32, No. 18, pp. 1629-1632.

"LM193/LM293/LM393/LM2903 Low Power Low Offset Voltage Dual Comparators", National Semiconductor, pp. 1-12, Jan. 1995.

"LT124/Series High Speed Current Mode Pulse Width Modulators," Linear Technology LT1241 Series, pp. 1-16, 1992.

A.S. Koslovski, "Fast Active Inrush Current Limiter for Boost-based Resistor Emulators," 16th International Telecommunications Energy Conference, Intelec '94, Vancouver, B.C., Canada, pp. 649-652, Oct. 30, 1994.

Brochure: "LM494, Pulse Width Modulated Control Circuit", National Semiconductor, 7 pages, Jun. 1989.

Brochure: "High-Efficiency, +5V Adjustable Step-Down Switching Regulator", Maxim Integrated Products, 8 pages, Dec. 1991.

MAXIM Data sheet for MAX 631/632/633 CMOS Fixed/Adjustable Output Step-Up Switching Regulators (Mar. 1990).

Article: "Getting Maximum Efficiency from a 4-20 mA transducer Power Supply," by Bernhard Konrad of Maxim Integrated Products, Sensors, pp. 74-75, Apr. 1996.

Schematic: Power supply circuited used in a process control transmitter which is believed to have been on sale more than one year prior to the filing of the present application.

"Notification of Transmittal of the International Search Report and the Written Opinion", PCT/US2005/010872.

* cited by examiner

PROCESS DEVICE WITH SWITCHING POWER SUPPLY

BACKGROUND OF THE INVENTION

The present invention relates to process field devices of the type used to monitor or control operation of an industrial process. More specifically, the present invention relates to process field devices which communicate on a two wire process control loop and which are completely powered with power received from the two wire process control loop.

Process devices are used in industrial process control systems to monitor and/or control industrial processes. A control device is a process device which is used to control the process. Example control devices include pumps, valves, actuators, solenoids, motors, mixers, agitators, breakers, crushers, rollers, mills, ball millers, kneaders, filters, blenders, cyclones, centrifuges, towers, dryers, conveyors, separators, elevators, hoists, heaters, coolers, and other such equipment. A transmitter is a process device which is used to sense (or monitor) operation of the process, for example by monitoring a process variable such as temperature, pressure, flow, etc. The monitored process variable is transmitted so that it can be used by other equipment in the process, for example by a central control room. Another example process device is a process monitor or communicator which is used to monitor operation of the process, equipment used in the process such as process transmitters or process controllers, and control process devices, for example by programming or sending instructions to the device.

Two wire process field devices are process devices which are located at a remote location or otherwise require electrical power which is received entirely through a connection to a two wire process control loop. A two wire process control loop refers to a wiring system utilizing two wires and which is used to carry information related to the process being monitored or controlled. For example, one standard type of two wire process control loop uses a 4–20 mA current level to represent a process variable. In such a configuration, a transmitter can control the current level to a value, such as 10 mA, which is representative of a sensed process variable such as pressure. Other process control loop configurations allow for the transmission of digital signals. The digital signals can be an alternative to transmission of an analog current level or can be in combination with transmission of the analog current level.

In order to reduce the amount of wiring required to couple to a process device, many process devices are entirely powered with power received from the two wire process control loop. Thus, the total amount of power available to the process device is limited. For example in a 4–20 mA current loop, the total power available is limited by the lowest level at which the current level can be set (for example 3.6 mA) and the maximum voltage drop available across the device (for example something less than 24 volts) in an intrinsic safe location. This is less than 0.9 watts available to power the device.

In many cases, the functionality of a process device is limited by the amount of power which is available from the two wire process control loop. For example, additional functionality may require addition computational capabilities from a microprocessor. This increased computational power requires greater electrical power and may exceed the power budget available from the loop. In order to increase the amount of power available to circuitry in a process field device, field devices typically utilize highly efficient power supplies to convert power received from the two wire process control loop into a regulated voltage level for use by internal circuitry. One type of power supply, the switching regulator has been used in process devices due to its efficiency in providing a regulated supply voltage to components in a field device. For example, the use of switching regulators is described in U.S. Pat. No. 5,535,243, which issued Jul. 9, 1996, entitled POWER SUPPLY FOR FIELD MOUNTED TRANSMITTER and U.S. Pat. No. 5,973,942, which issued Oct. 26, 1999, entitled START UP CIRCUIT FOR DC POWERED FIELD INSTRUMENT. However, a switching regulator may introduce noise into the process control loop which may alter or otherwise detrimentally affect transmission of information on the loop.

SUMMARY

A process field device for coupling to a two wire process control loop includes a field device circuitry and a switching regulator configured to power the field device circuitry. A bulk capacitance is coupled to an input of the switching regulator and configured to provide power to the switching regulator. A series voltage regulator provides a regulated supply voltage to the bulk capacitance. A noise filter couples the series voltage regulator to the two wire process control loop and reduces noise due to the switching regulator in the two wire process control loop.

A method of providing power to a circuitry of a field device in a two wire process control loop including receiving power from the two wire process control loop and preregulating the received power to a regulated voltage level. Noise from the switching regulator is filtered from entering the two wire process control loop.

DETAILED DESCRIPTION

Figure 1:
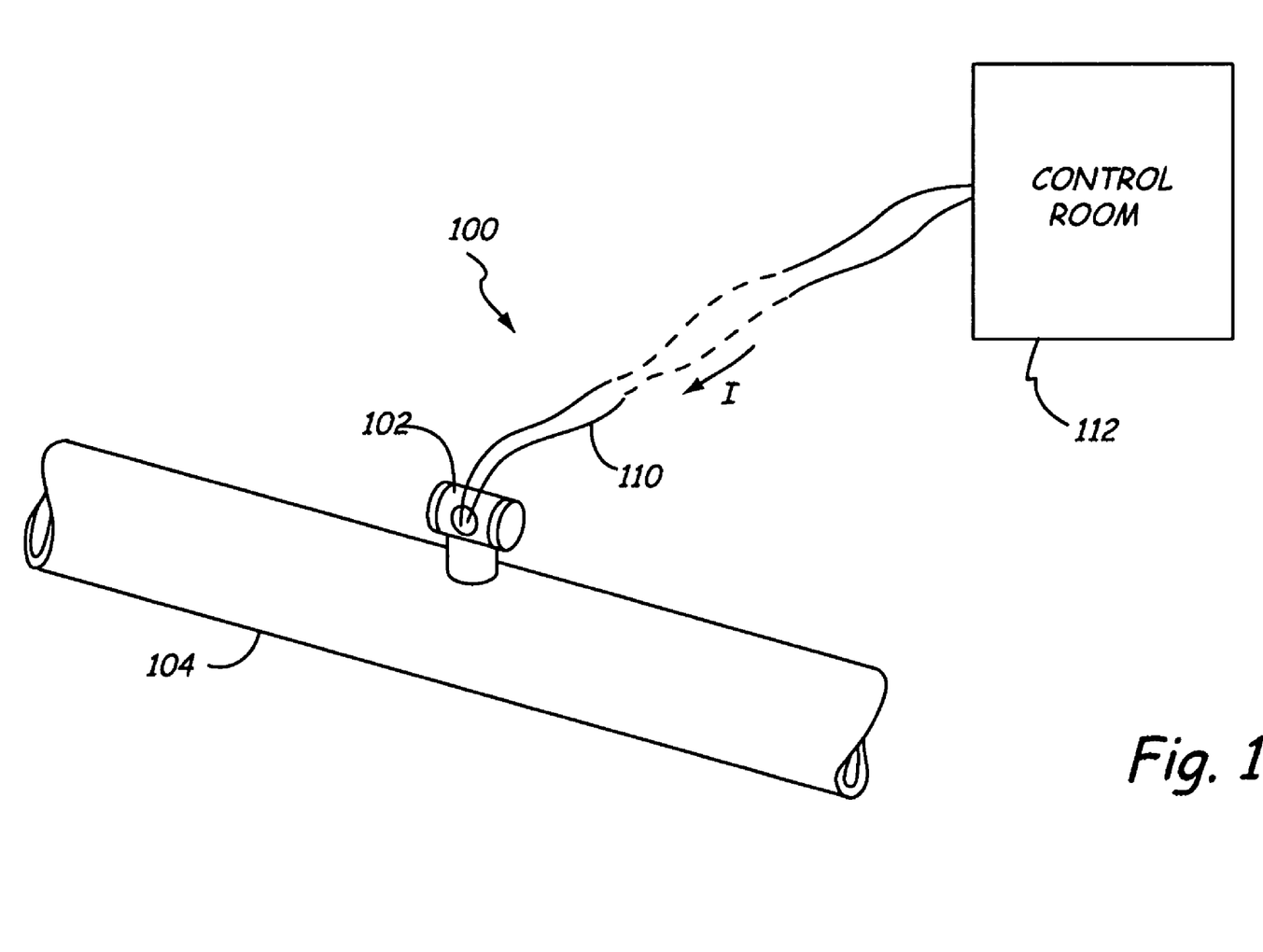
FIG. 1 is a simplified diagram showing a process control or monitoring system including a process device coupled to a two wire process control loop.

As discussed in the Background section, some types of process field devices are completely powered using power received from the same two wire process control loop which is used to transmit information related to the process. FIG. 1 is a simplified diagram of an industrial process control or monitoring system 100 in which one type of two wire process field device, a process transmitter 102, couples to an industrial process, specifically process piping 104. Transmitter 102 also couples to a two wire process control loop 110 which connects to a control room 112. The process control loop 110 is illustrated as carrying a current I and may operate in accordance with any technique including industrial standards such as the HART® communication standard, a Fieldbus or Profibus standard, etc. Although a process transmitter 102 is described, the present invention can be implemented in any type of process device in which efficient power conversion is desired. Control room 112 can comprise a remote location for use by operators or other service personnel, or can comprise any termination or location along the process control loop 110 or other location.

Figure 2:
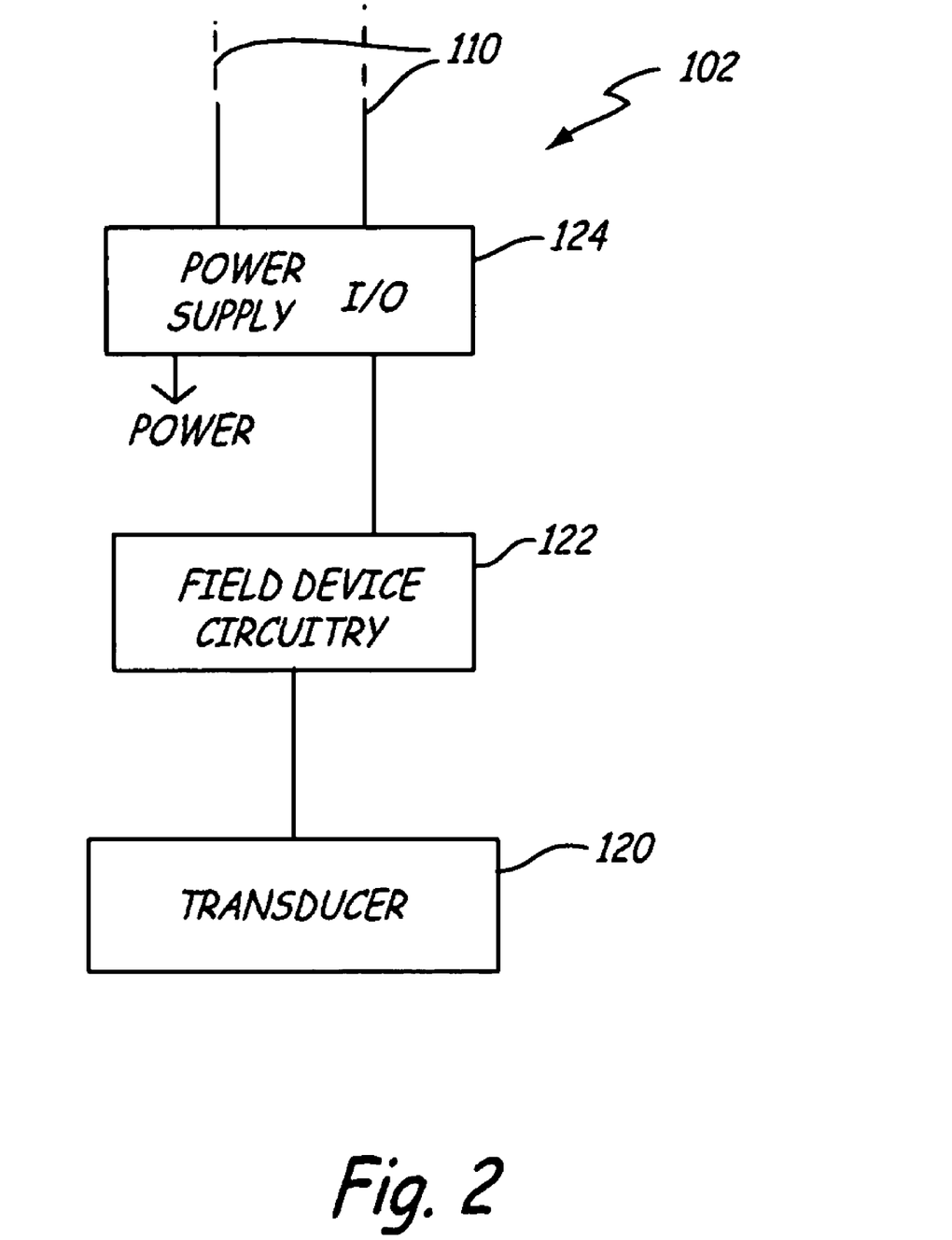
FIG. 2 is a simplified block diagram of circuitry in a field device including a power supply for providing power to the device.

FIG. 2 is a simplified block diagram of the transmitter 102 shown in FIG. 1. Transmitter 102 includes a transducer 120 for coupling to a process. For example, the transducer 120 can be a sensor such as a pressure, temperature or other sensor for measuring a process variable. In a field device which is capable of controlling the process, the transducer can comprise, for example, a valve, heating element, etc. Field device circuitry 122 couples to the transducer 120 and is used, for example, to calibrate or compensate process variable measurements, calculate process variables, perform diagnostics, or any other function which may be performed in a field device. In general, additional functionality in the field device circuitry 122 will increase the power requirements of the circuitry 122. A power supply and I/O circuit 124 is shown coupling to field device circuitry 122 and to the two wire process control loop 110. Circuitry 124 is used for communication over the two wire process control loop 110, for example to transmit a measured or calculated process variable over loop 110 to the control room 112 shown in FIG. 1. Circuitry 124 also provides a power output for providing all electrical power required by circuitry within the transmitter 102.

As discussed in the Background section, process field devices which are completely powered with power received from a process control loop may require a highly efficient voltage regulator in order to meet their power requirements. Typically, this means that a switching regulator is used to power the field device. One drawback of a switching regulator is that it requires a relatively large capacitors in order to operate without introducing noise into the system. This can be particularly problematic in environments in which large capacitance values cannot be used. For example, in order to meet intrinsic safety requirements, the amount of energy which a field device may store is limited. This makes it difficult to meet the requirements of having limited noise introduced into the two wire communication link, low power draw from the two wire communication loop along with maintaining the low capacitance necessary for intrinsic safety requirements.

Figure 3:
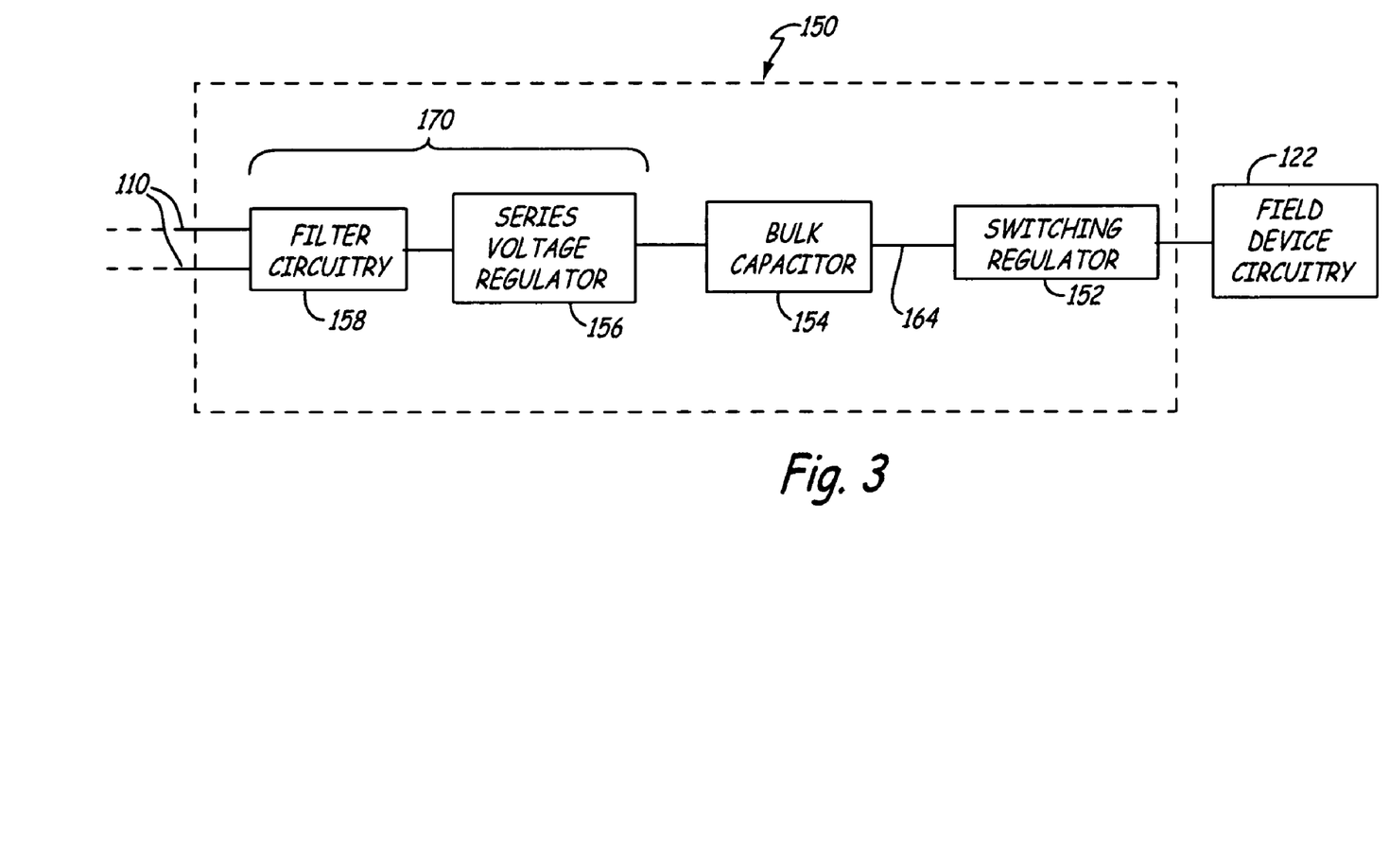
FIG. 3 is a simplified block diagram of power supply circuitry in the field device.

FIG. 3 is a simplified block diagram showing power supply circuitry 150 in greater detail. Power supply circuitry 150 couples to two wire process control loop 110 and provides power to field device circuitry 122. The power supply circuitry 150 includes a switching regulator 152 which provides the power supply output to the field device 122. A bulk capacitor 154 provides an input to the switching regulator 152 and is powered by series voltage regulator 156. The series voltage regulator 156 is powered from the two wire process control loop 110 through filter circuitry 158. In accordance with the present invention, the configuration shown in FIG. 3 substantially reduces the amount of noise generated by the switching regulator 152 which is injected back into two wire process control loop 110.

The configuration illustrated in FIG. 3 provides a preregulator circuit 170 to the switching regulator 152 which generates a regulated input voltage on connection 164 for use by the switching regulator 152. For example if the current drawn by the field device circuitry 122 suddenly increases, the switching regulator 152 draws power from bulk capacitor 154 and may not be able to respond fast enough to this current spike. If the switching regulator 158 is able to draw current directly from the process control loop 110, this current spike will introduce noise into loop 110. However, with the present invention, filter circuitry 158 reduces the response time of the regulator 156 such that the peak current draws from switching regulator 152 are forced to be fulfilled with energy from bulk capacitor 154 rather than from loop 110. The circuitry can be configured so that any noise which is introduced into the loop 110 is outside of the frequency range used for communication on loop 110. For example, higher frequency noise on loop 110 has a reduced effect on readings obtained in the control room 112. Therefore, if the preregulator circuitry 170 provides a low pass filter, the majority of the noise from the switching regulator 152 can be blocked from the two wire process control loop 110. However, the filter circuitry 158 should be implemented without the use of a large capacitance in order to meet intrinsic safety requirements. This means that traditional capacitive filtering techniques cannot be used in such an implementation.

With the present invention, the filter circuitry 158 of the series preregulator 170 is configured to utilize capacitors which are sufficiently small to meet intrinsic safety requirements while still providing sufficient filtering to prevent current variations from entering loop 110 due to the switching regulator 152. The filter circuitry 158 includes at least one active component to increase the filtering capabilities of the circuit. The active component can be, for example, a transistor such as a field effect transistor, a three terminal device, a non-linear device, or other component.

Figure 4:
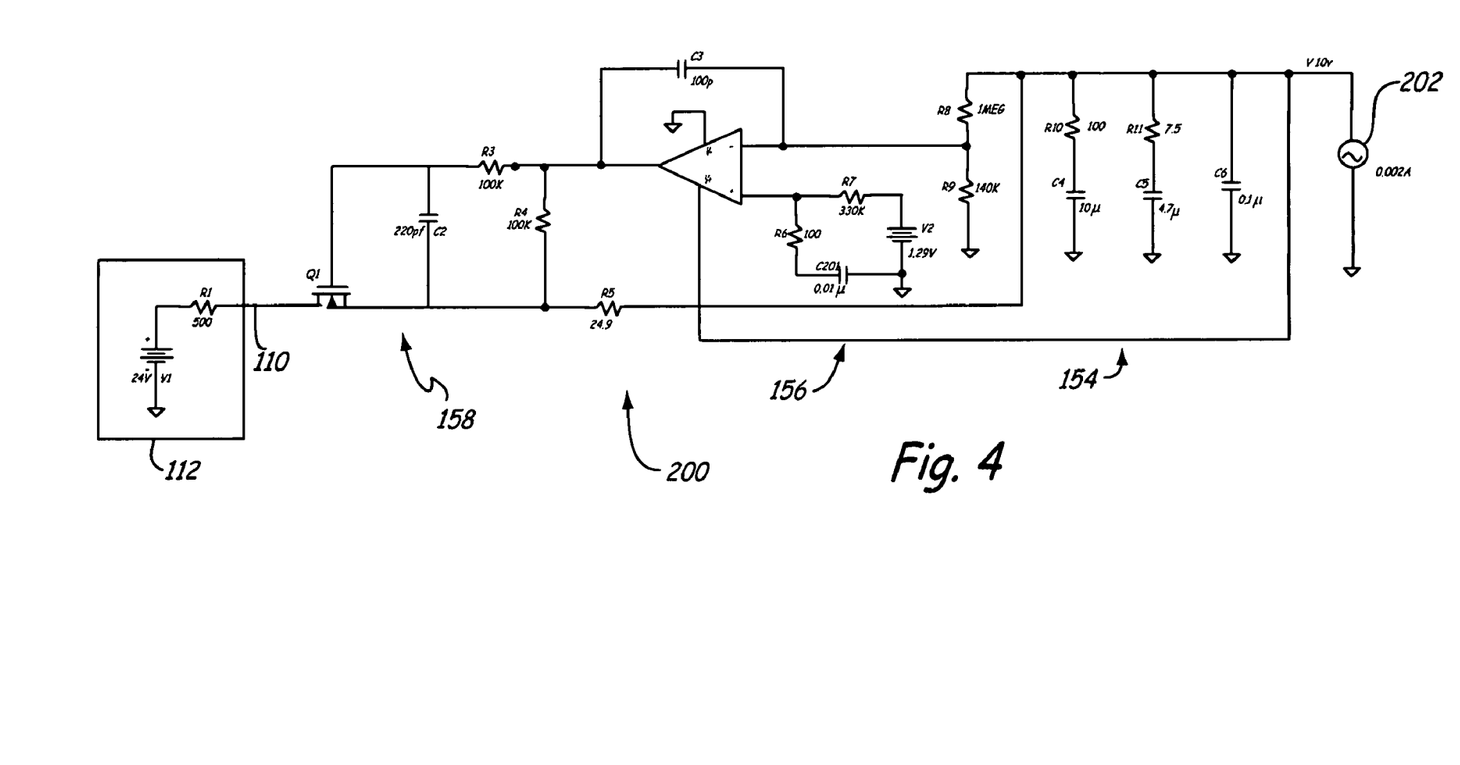
FIG. 4 is a schematic diagram showing one example embodiment of the power supply circuitry of the present invention.

FIG. 4 is a schematic diagram of one implementation of power supply circuitry 200 in accordance with the present invention. Power supply circuitry 200 is illustrated as being coupled through process control loop 110 to control room 112. The control room circuitry 112 is modeled as a 24 volt source in series with a 500 ohm resistance. The switching regulator is modeled as an A/C current source 202 which represents the noise introduced by the switching regulator into the circuitry. The bulk capacitor 154 is formed by capacitors C4, C5 and C6 along with intrinsic safety resistors R10 and R11. The voltage pre-regulator 156 includes an opamp configured to provide a regulated 10 volt output to the switching regulators. The opamp is configured with negative feedback with capacitor C3 and has its inverting input set to a voltage level by resistors R8 and R9. The non-inverting input is coupled to a voltage reference V2, such as a zener diode. In one embodiment, the operational amplifier comprises a TLC27L4 available from Texas Instruments. Resistor R4 is configured to provide a start up voltage to boot strap operation of regulator 156. Filter circuitry 158 includes an N-type depletion mode field effect transistor Q1 and provides an active element as discussed above. A small capacitor C2 is connected across the gate and drain of transistor Q1. During operation any noise present at the 10 volt power supply rail due to operation of the switching regulator 152 will be filtered by capacitor C2 and resistor R3. Capacitor C2 and Resistor R3 enable increased filtering capabilities of Q1. This substantially decreases the amount of noise signal which enters the two wire process control loop.

Figure 5:
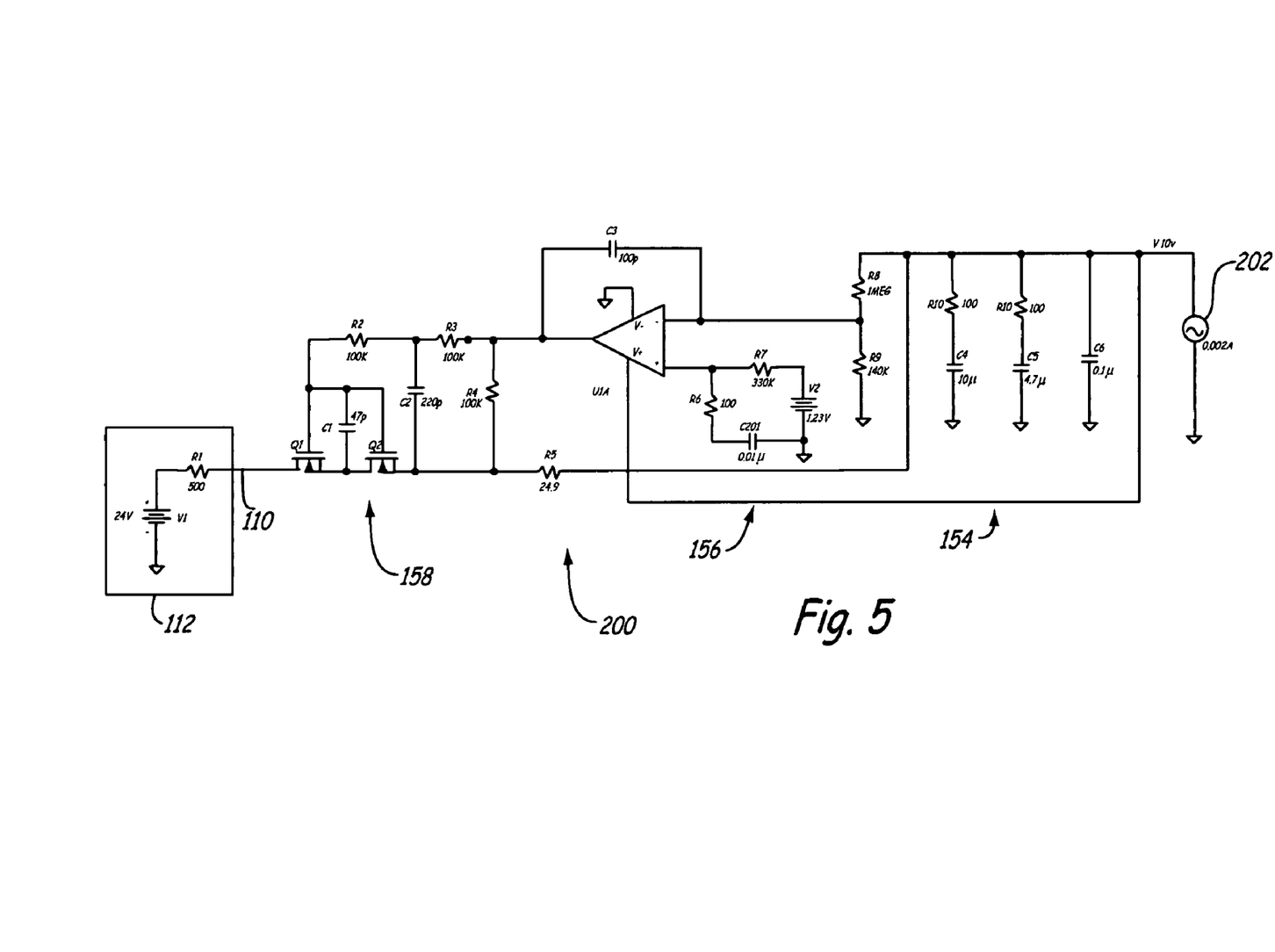
FIG. 5 is a schematic diagram showing another example embodiment of the power supply circuitry of the present invention.

FIG. 5 is a circuit diagram of power supply circuitry 220 which represents another implementation in accordance with the present invention. However, in the configuration of FIG. 5, filter circuitry 158 includes two active elements formed by transistors Q1 and Q2, an additional capacitor C1 of 47 pF and additional resistor R2. This configuration provides two stages of filtering to further increase the filtering capabilities of the capacitors.

The particular switching regulator used with the circuitry can be selected as desired. In one configuration, two switching regulators are used to generate two voltages. For example, a LTC1771 from Linear Technology can be used to generate a 5.2 volt supply voltage and an LTC1474 can be used to generate a 3.0 volt supply voltage.

Figure 6:
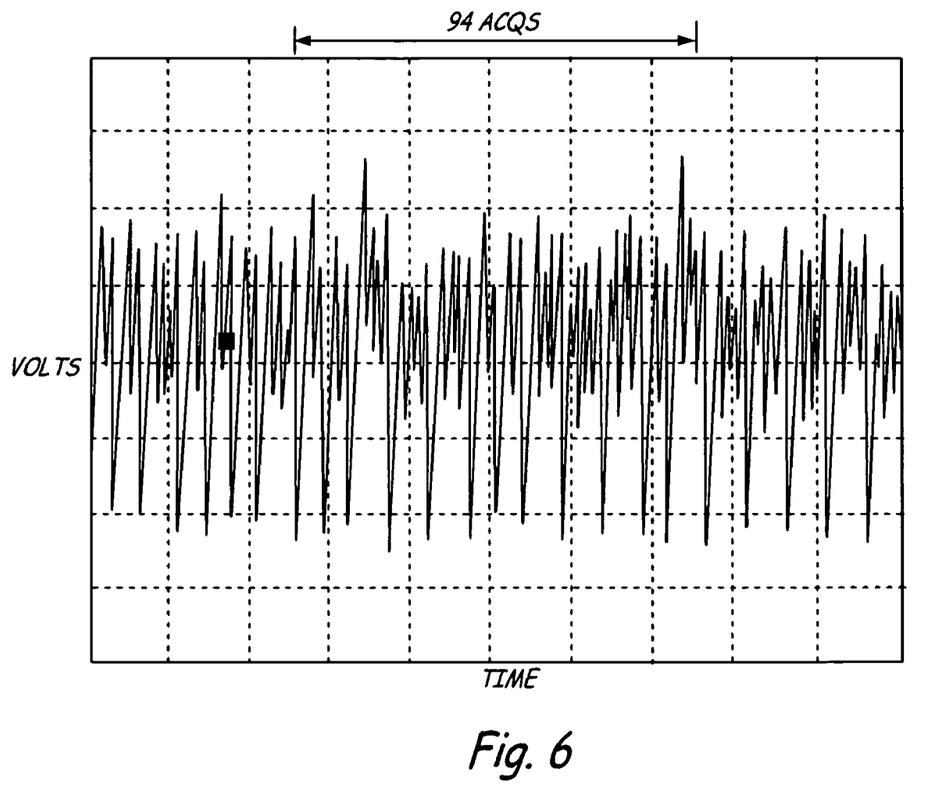
FIG. 6 is a graph illustrating signal noise versus time which shows the signal noise injected into a two wire process control loop.
Figure 7:
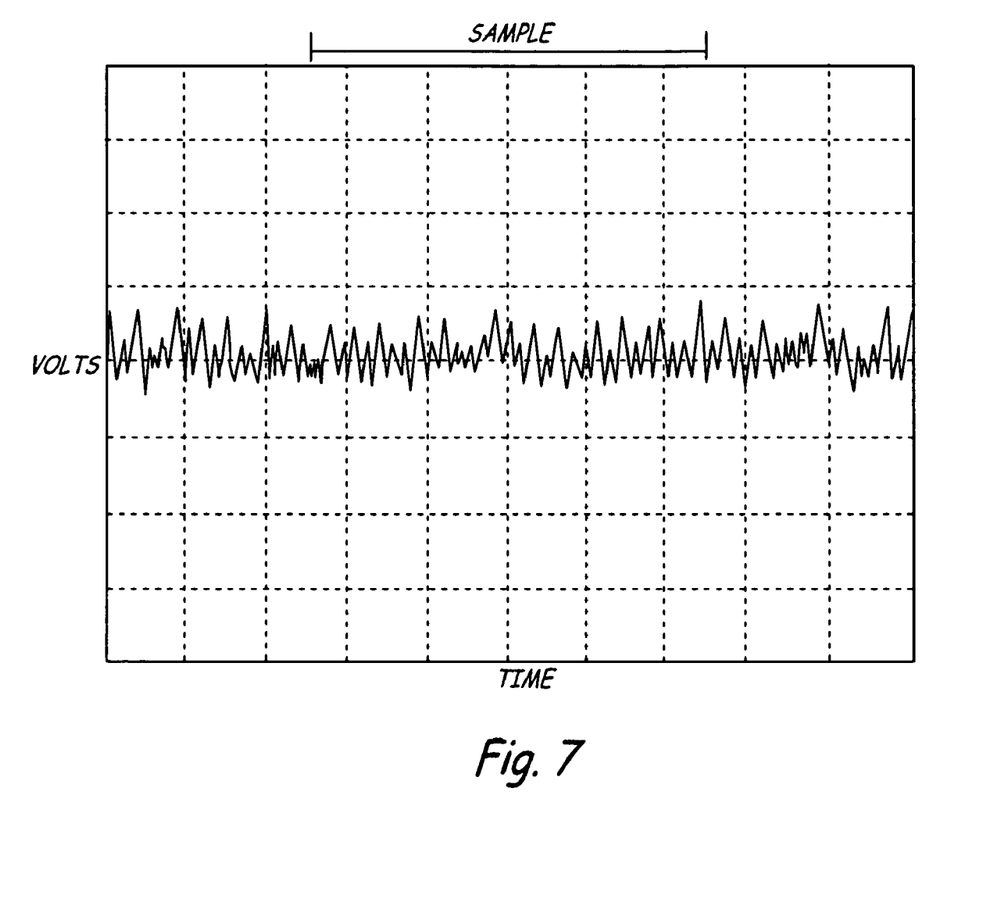
FIG. 7 is a graph of signal noise versus time similar to FIG. 6 which illustrates the reduced signal noise due to the configuration of the present invention.

FIG. 6 is a graph of signal amplitude versus time and illustrates the noise signal applied to a process control loop when no additional filtering is used. This loop noise is measured across a 500 Ohm resistive load. On the other hand, FIG. 7 is the same graph showing the noise signal using the circuit configuration illustrated in FIG. 5.

Although the present invention has been described with reference to preferred embodiments, workers skilled in the art will recognize that changes may be made in form and detail without departing from the spirit and scope of the invention. The present invention can be used with all types of field devices, although it is particularly applicable to those devices which are completely powered with power received from a two wire process control loop. However, the invention can be utilized with other process field devices in which there is a relatively tight power budget. Although particular circuitry and configurations are illustrated herein, the invention is not limited to these configurations.

What is claimed is:

1. A process field device for coupling to a two wire process control loop, comprising:
   a field device circuitry;
   a switching regulator configured to power the field device circuitry;
   a bulk capacitance coupled to an input of the switching regulator configured to provide power to the switching regulator;
   a series voltage regulator configured to provide a regulated supply voltage to the bulk capacitance; and
   a noise filter configured to couple the series voltage regulator to the two wire process control loop to power the series voltage regulator with power from two wire process control loop and to block noise from the switching regulator from entering the two wire process control loop.

2. The apparatus of claim 1 wherein the noise filter includes a capacitor.

3. The apparatus of claim 2 wherein the noise filter includes an active component configured to increase the effective capacitance of the capacitor.

4. The apparatus of claim 3 wherein the active component includes three terminals.

5. The apparatus of claim 4 wherein a first terminal of the active component couples to the two wire process control loop, a second terminal of the component couples to the bulk capacitance and a third terminal of the component couples to the series voltage regulator.

6. The apparatus of claim 5 wherein the active component comprises a field effect transistor and third terminal comprises a gate of the field effect transistor.

7. The apparatus of claim 4 wherein a first terminal of the component couples to the two wire process control loop, a second terminal of the component couples to one side of the capacitor and a third terminal couples to another side of the capacitor.

8. The apparatus of claim 1 wherein the noise filter includes a field effect transistor.

9. The apparatus of claim 1 wherein the noise filter includes two field effect transistors and two capacitors.

10. The apparatus of claim 1 wherein the series voltage regulator includes an operational amplifier.

11. The apparatus of claim 10 wherein the series voltage regulator includes a capacitor configured to provide negative feedback to the operational amplifier.

12. A method of providing power to a circuitry of a field device in a two wire process control loop, comprising:
    receiving power from the two wire process control loop;
    preregulating the received power to a regulated voltage level;
    charging a bulk capacitance with the regulated voltage level;
    providing power to the circuitry of the field device with a switching regulator coupled to the bulk capacitance; and
    filtering noise from the switching regulator from entering the two wire process control loop.

13. The method of claim 12 wherein filtering noise from the switching regulator includes actively filtering noise.

14. The method of claim 13 wherein actively filtering noise includes using a three terminal active component.

15. The method of claim 14 wherein a first terminal of the active component couples to the two wire process control loop, a second terminal of the component couples to the bulk capacitance and a third terminal of the component couples to a series voltage regulator.

16. The method of claim 13 wherein the active component comprises a field effect transistor and third terminal comprises a gate of the field effect transistor.

17. The method of claim 12 wherein filtering noise includes using a capacitor.

18. The method of claim 17 wherein filtering noise includes using an active component configured to increase the effective capacitance of the capacitor.

19. The method of claim 18 wherein the active component includes three terminals.

20. The method of claim 19 wherein a first terminal of the component couples to the two wire process control loop, a second terminal of the component couples to one side of the capacitor and a third terminal couples to another side of the capacitor.

21. The method of claim 12 wherein filtering noise includes using a field effect transistor.

22. The method of claim 12 wherein filtering noise includes using two field effect transistors and two capacitors.

23. The method of claim 12 wherein the preregulating includes using operational amplifier.

24. The method of claim 23 wherein preregulating further includes providing negative feedback to the operational amplifier through a capacitor.

* * * * *